P. J. SIMMEN.
SPEED CONTROL SYSTEM.
APPLICATION FILED SEPT. 10, 1917.

1,315,346.

Patented Sept. 9, 1919.
2 SHEETS—SHEET 1.

Inventor
Paul J. Simmen
per
Lyman E. Dodge
Attorney

UNITED STATES PATENT OFFICE.

PAUL J. SIMMEN, OF BUFFALO, NEW YORK.

SPEED-CONTROL SYSTEM.

1,315,346.	Specification of Letters Patent.	Patented Sept. 9, 1919.

Application filed September 10, 1917. Serial No. 190,482.

*To all whom it may concern:*

Be it known that I, PAUL J. SIMMEN, a citizen of the United States, residing at Buffalo, in the county of Erie and State of New York, have invented certain new and useful Improvements in Speed-Control Systems, of which the following is a specification.

This invention relates to a speed control system for automatically controlling the speed of vehicles.

The object of this invention is to provide a system by which the speed of a moving vehicle may be automatically controlled so as as to prevent the vehicle from exceeding a speed which is safe for the particular condition of the track over which the vehicle is running. More specifically this invention relates to a speed control device in which intermittent influences outside the vehicle cause the speed control mechanism to move to various positions as the train moves along the trackway. The speed control mechanism includes a permissible speed device which may be met in a plurality of positions, and the devices on the vehicle are so arranged that when the permissible speed device is moved from a given permissible speed position to a lower permissible speed position such movement is not suddenly made, but is so accomplished that the reduction of the permissible speed for the vehicle is in accordance with the normal braking curve for the vehicle.

Other objects and advantages will appear as the description of the invention progresses and the novel features will be particularly pointed out in the appending claims.

Figure 1:
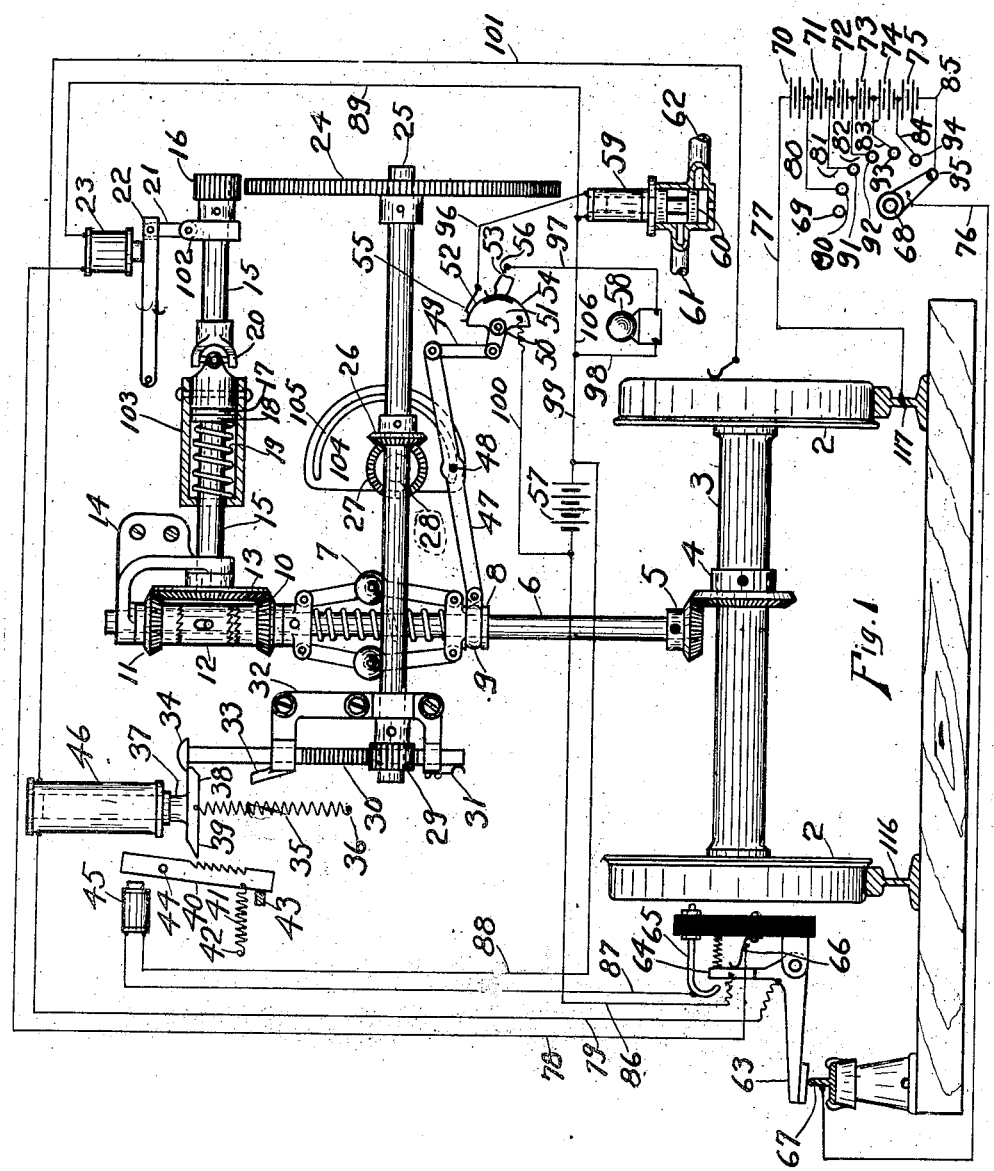
Figure 2:
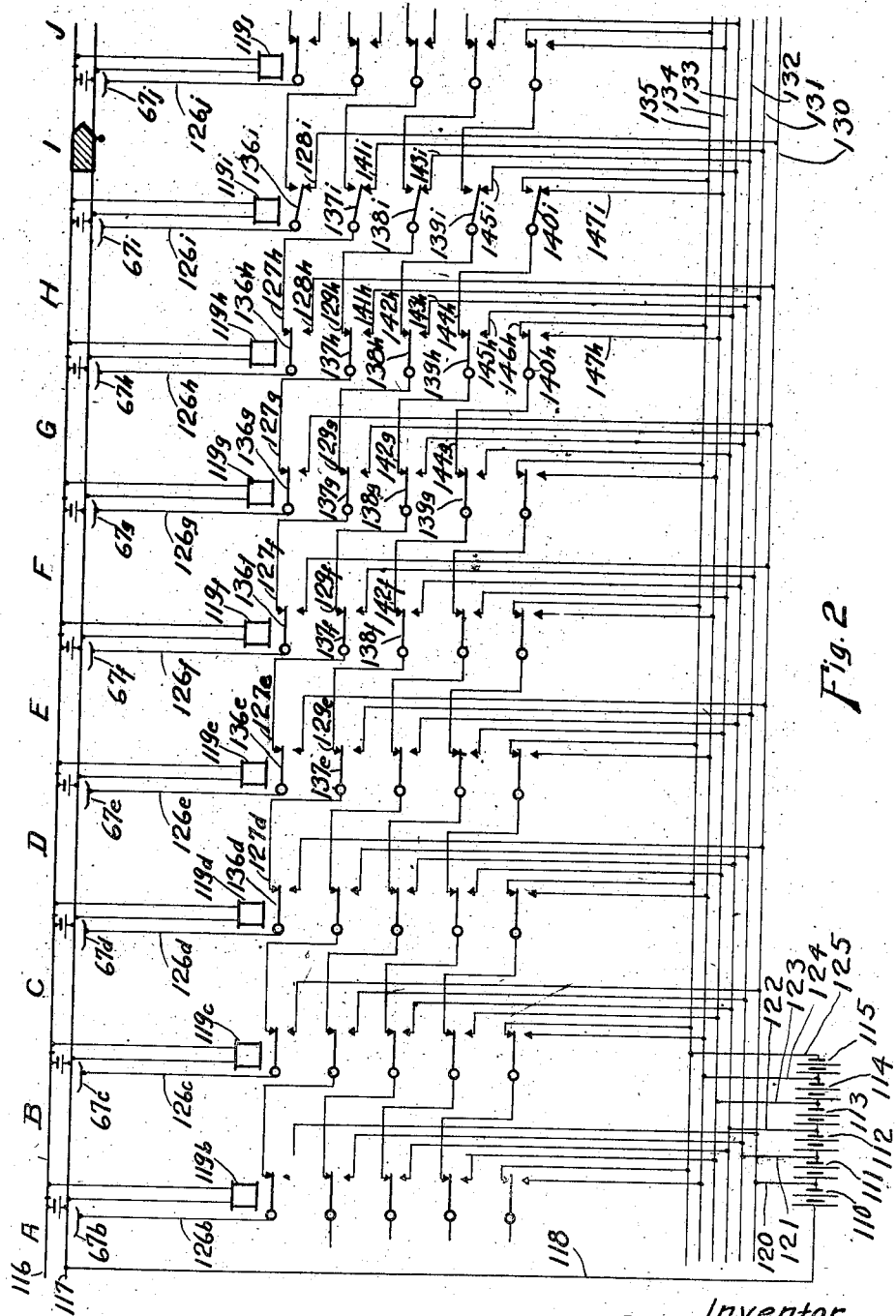

In describing the invention in detail reference is had to the accompanying drawings, wherein I have illustrated a preferred physical embodiment of my invention, and wherein like characters of reference designate corresponding parts throughout the several views, and in which:

Figure 1 is a diagrammatic view of the vehicle carried devices together with means for operating said devices. Fig. 2 is a diagrammatic view of a trackway, having automatic means for operating the vehicle carried devices.

Referring to Fig. 1, 116 and 117 are the rails upon which the vehicle is adapted to travel. 2, 2 are the wheels of the vehicle and 3 is its axle. Rigidly mounted upon the axle 3 is a bevel gear 4, which meshes with a bevel gear 5, which is rigidly mounted on a vertical shaft 6. The vertical shaft 6 is suitably supported in a bearing contained in the bracket 14. A centrifugal governor 7 is mounted on the shaft 6, the upper collar of the governor 7 being rigidly attached to the said shaft 6, and the lower collar 8 being slidable upon the shaft 6, and having an annular groove in which groove is an annular ring 9. At the upper end of the vertical shaft 6 are bevel gears 10 and 11, which are rotatably mounted upon the shaft 6, and both of which mesh with a bevel gear 13, which is rigidly mounted upon a shaft 15. On the shaft 6 between the bevel gears 10 and 11 is a collar 12, which is prevented from rotating with respect to the shaft 6 by a pin. The said pin, however, does not restrict the collar 12 from longitudinal motion with respect to the shaft 6, as a vertical slot is provided in the collar 12 to provide for such motion. The upper end of the collar 12 is provided with a series of teeth which mesh with similar teeth in the lower end of the body of the bevel gear 11. The lower end of the collar 12 is provided with teeth similar to the teeth in the upper end of the collar 12, but cut in a reverse direction, and these teeth mesh with similar teeth on the upper end of the body of the bevel gear 10. The object of the bevel gears 10, 11 and 13 and the collar 12 is to drive the shaft 15 in the same direction, no matter in what direction the shaft 6 is rotating.

The shaft 15 is suitably supported at one end by a bearing contained in the bracket 14 and at the other end by a bearing 102. The shaft 15 is provided with a universal joint 20 and a friction clutch 103, the friction clutch consisting of two disks 17 and 18, which are pressed together by the spring 19. The bearing 102 is connected by a link 21 with an armature 22 of an electromagnet 23. Adjacent to the bearing 102 there is rigidly attached to the shaft 15 a spur gear 16, which is adapted under certain circumstances to mesh with a gear 24. When the electromagnet 23 is energized, its armature is attracted and the gear 16 is held out of mesh with the gear 24, but when the electromagnet 23 is deënergized, its armature 22 is dropped to its lower position and the gear 16 meshes with the gear 24.

The gear 24 is rigidly mounted on the shaft 25, which shaft is supported in a bearing contained in the bracket 32. At the end of the shaft 25 there is rigidly attached thereto a gear 29, which is adapted to mesh with a rack 30. The rack 30 is suitably supported in bearings contained in the bracket 32, so that it is capable of up and down motion. The motion of the rack 30 is restricted by a friction spring 31, which bears against the lower part of the rack 30. Rigidly attached to the shaft 25, near its center is a bevel gear 26 which meshes with a bevel gear 27, which is rigidly attached to the shaft 28. Also rigidly attached to the shaft 28 is a cam 104, having a slot 105 in which there is a roller 48, the said roller 48 being rotatably attached to a floating lever 47. The floating lever 47 has one end pivotally attached to the annular ring 9, which is supported by the lower collar 8 of the governor 7, and the other end of the floating lever 47 is attached by a link 49 to a sector 51, which is pivotally attached to a convenient part of the vehicle at 50. The surface of the sector 51 is divided into three parts, as follows: 52 a conducting surface, 53 an insulating surface and 54 a conducting surface, the insulating surface 53 being between the two conducting surfaces 52 and 54.

At a convenient place on the vehicle is mounted the solenoid 46, having a plunger 37. When the solenoid 46 is energized, the plunger 37 is raised against the tension spring 35, one end of which is attached to a convenient part of the vehicle at 36. The plunger 37 is provided at its lower end with two horizontally extending arms 38 and 39. The upper part of the arm 38 is adapted to touch a head 34 provided at the top end of the rack 30, and it will be apparent that the result of such construction is that when the plunger 37 is moved upward, its arm 38 will touch the head 34 of the rack 30, and therefore, move said rack upward. The downward movement of the plunger 37 is limited by the stop 33, which is an extension of the bracket 32 and is adapted to coöperate with the arm 38. The arm 39 of the plunger 37 has a pointed end, which is adapted to be engaged by one of a series of teeth, which are on one side of a member 40. The member 40 is pivotally attached to a convenient part of the vehicle at 44, and the upper end of the member 40 acts as the armature of an electromagnet 45. Whenever the electromagnet 45 is energized, the upper end of the member 40 is attracted, the lower end being moved toward the arm 39 so that the end of said arm is engaged by one of the series of teeth on the member 40. This action results in holding the plunger 37 in the position, which it has assumed when the electromagnet 45 becomes energized. It will be noted that motion of the member 40 which has been described is against a tension spring 41, one end of which is rigidly attached to a convenient part of the vehicle at 42. When, therefore, the electromagnet 45 becomes deënergized, the spring 41 draws the lower end of the member 40 back against a stop 43, thus leaving the plunger 37 free to be moved.

Located in the train line air pipe there is a valve 60, whose valve stem forms the plunger of an electromagnet 59. When the electromagnet 59 is energized, the valve 60 is in its upper position, and air pressure from the train line air pipe 61 is communicated to the annular chamber surrounding said valve, thus retaining the valve in a balanced condition as far as air pressure is concerned. When, however, the electromagnet 59 becomes deënergized, the valve 60 drops by gravity to its lower position and the air from the train line air pipe 61 is communicated to the atmosphere by means of the pipe 62 and the annular chamber surrounding the valve 60, and an application of the air brakes results.

Hingedly mounted at a convenient place on the vehicle is a contact shoe 63, adapted to contact with ramp or signal rails 67 suitably arranged along the trackway. Attached to, but insulated from the main body of the shoe 63 is an arm 64 which is adapted, when the contact shoe is raised by a signal rail 67, to touch a contact spring 66; but when the shoe 63 is in its lower position and is not being raised by a signal rail 67, the arm 64 contacts with the contact 65. There is also provided at a suitable place on the vehicle a battery or other source of energy 57 and an electric bell or warning signal 58.

Adjacent to the trackway is a series of batteries 70, 71, 72, 73, 74 and 75. The battery 70 has one terminal connected by a wire 77 with the track rail 117. The other terminal of the battery 70 is connected to the opposite terminal of the battery 71, and the connecting point of these two batteries is connected by a wire 80 with a contact point 90. The other terminal of the battery 71 is connected to the opposite terminal of the battery 72, and the connecting point of these two batteries is connected by a wire 81 with a contact point 91. The other batteries are similarly connected so that the connecting point of the batteries 72 and 73 is connected by a wire 82 with a contact point 92; the connecting point of the batteries 73 and 74 is connected by a wire 83 with a contact point 93; the connecting point of the batteries 74 and 75 is connected by a wire 84 with a contact point 94, and the remaining terminal of the battery 75 is connected by a wire 85 with a contact point 95. An arm 68 is provided which is capable of being moved to touch any of the contact points mentioned, and this arm 68 is connected by a wire 76 with the signal rail 67.

The result of these connections is that when the arm 68 is touching the contact point 90, the difference of potential between the signal rail 67 and the track rail 117 will be equal to the voltage of the battery 70. When the arm 68 is touching the contact point 91, the said difference of potential will be equal to the combined voltage of batteries 70 and 71. When the arm 68 is touching the contact point 92, the said difference of potential will be equal to the combined voltage of the batteries 70, 71 and 72. When the arm 68 is touching the contact point 93, the said difference of potential will be equal to the combined voltage of the batteries 70, 71, 72 and 73. When the arm 68 is touching the contact point 94, the said difference of potential will be equal to the combined voltage of the batteries 70, 71, 72, 73 and 74, and when the arm 68 is touching the contact point 95, the said difference of potential will be equal to the combined voltage of the batteries 70, 71, 72, 73, 74 and 75. When the arm 68 is touching the contact point 69, which is not connected to any of the batteries 70, 71, 72, 73, 74 or 75, there will be no difference of potential between the signal rail 67 and the track rail 117.

The operation of this device is as follows: Assuming that the arm 68 is in contact with the contact point 95, there will be the maximum difference of potential between the signal rail 67 and the track rail 117. If now the vehicle has its contact shoe 63 in contact with the signal rail 67, current will flow through the following circuit: from the signal rail 67 to the shoe 63, wire 79, solenoid 46, wire 101, wheels 2 to the track rail 117. It will be noted that while the shoe 63 is in contact with the signal rail 67, the electromagnet 23 will be energized through the following circuit: from the positive side of the battery 57 to the wire 86, arm 64, contact 66, wire 78, electromagnet 23, wires 89, 106 and 99 to the negative side of the battery 57. This will cause the gear 16 to be drawn out of mesh with the gear 24 and the shaft 25 will therefore be disconnected from the wheels of the vehicle. The circuit heretofore described for the solenoid 46 will then cause the plunger 37 to be drawn to its maximum position, and the resultant upward movement of the rack 30 will then cause rotation of the gear 29, the shaft 25, bevel gears 26 and 27, shaft 28 and the cam 104, causing the said cam to be moved to its maximum speed position. Upon leaving the signal rail 67, the shoe 63 will be returned by gravity and spring pressure to its lower position and the arm 64 will contact with the contact 65. This will cause the electromagnet 45 to become energized through the following circuit: from the positive side of the battery 57, to the wire 86, arm 64, contact 65, wire 87, electromagnet 45, wire 88 to the negative side of the battery 57. This will move the member 40 so that its teeth will engage the arm 39 of the plunger 37, holding the said plunger in the position in which it was set by the outside battery. Also, as soon as the shoe 63 leaves the signal rail 67, the circuit, which was heretofore described for the electromagnet 23, will be broken due to the lowering of the shoe, and the gear 16 will again drop into mesh with the gear 24. The movement of the vehicle will tend to rotate the shaft 25, so that the cam 104 will be moved from its maximum speed position to a lower speed position, but on account of the fact that a locking effect takes place due to the relation of the plunger 37, the member 40, and the head 34 of the rack 30, no movement of the shaft 25 can take place, and the result is that slippage takes place in the friction clutch 103 and the gear 16 will not be rotated.

Assuming now that the shoe 63 comes in contact with a signal rail 67 and that the arm 68 for that rail is touching the contact point 94, the raising of the shoe by such signal rail will again result in deënergizing the electromagnet 45, and in energizing the electromagnet 23. Therefore, the gear 16 will be raised out of mesh with the gear 24 and the member 40 will be moved so that the plunger 37 is free to be moved. As the difference of potential between the signal rail 67 and the track rail 117 is only equal to the combined voltage of the batteries 70, 71, 72, 73 and 74, the plunger 37 will now assume a lower position than heretofore. On account, however, of the friction spring 31 which bears against the lower end of the rack 30, the rack 30 will not drop to a position corresponding to the new position of the plunger 37. Upon leaving such signal rail, the shoe 63 will return to its lower position and the electromagnet 45 will again become energized, thus causing the plunger 37 to be locked in its new position. The electromagnet 23 will again become deënergized, the gear 16 will be dropped into mesh with the gear 24, and the movement of the vehicle will cause the cam 104 to be driven in accordance with the movement of the vehicle from its maximum speed position to a lower speed position. When such position is reached, the head 34 of the rack 30 will be touching the arm 38, and the locking effect heretofore described, will again take place, preventing further movement of the cam 104 due to the slippage which then takes place in the friction clutch 103.

When the contact shoe 63 is moved upon other signal rails 67, which have a lower voltage applied to them than was applied to the last signal rail encountered, a similar result will take place, the plunger 37 being in each case moved to a position corresponding to the voltage applied to the signal rail, the cam 104 being subsequently moved in accordance with the movement of the vehicle to a permissible speed position corresponding to the new position of the plunger 37.

When it occurs that a signal rail 67 is encountered to which is applied a higher voltage than the voltage of the last signal rail encountered, the plunger 37 will be moved upward to its new position corresponding to the voltage applied to the particular signal rail with which the shoe is in contact and at the same time, the rack 30 and the cam 104 will be moved to a corresponding position. It will be understood that the friction spring 31 bears with sufficient friction on the rack 30 to prevent the said rack from moving down as a result of gravity, but does not bear with enough friction to prevent the rack 30 from being moved up, due to an upward movement of the plunger 37.

When the plunger 37 is in its maximum position as shown in Fig. 1, the cam 104 will also be in its maximum speed position. It will be noted that under these circumstances a movement of the vehicle will result in the lower collar 8 of the governor 7 being moved upward, causing the floating lever 47 to rotate about the roller 48 as a pivot. Such a movement of the vehicle or such increase in the speed of the vehicle will further cause a downward movement of the link 49 and a consequent rotation of the sector 51. Normally the electromagnet 59 of the air valve 60 is energized through the following circuit: from the positive side of the battery 57 to the wire 100, sector 51, conducting surface 52, contact spring 55, wire 96, electromagnet 59, wires 106, and 99 to the negative side of the battery 57. If the speed of the vehicle should exceed a predetermined maximum speed, the sector 51 will be so rotated that the contact spring 56, which normally touches the insulating surface 53, will touch the conducting surface 54 and the warning signal 58 will be sounded through the following circuit: from the positive side of the battery 57 to the wire 100, sector 51, conducting surface 54, contact spring 56, wire 97, warning signal, 58, wires 98 and 99 to the negative side of the battery 57. If the train operator does not reduce the speed of the vehicle when the warning signal begins to sound, a slight further increase in the speed of the vehicle will cause further rotation of the sector 51 upon which the contact spring 55 will no longer touch the conducting surface 52, but will touch the insulating surface 53, and the circuit heretofore described for the electromagnet 59 will be broken, causing an automatic application of the brakes to take place.

When the cam 104 is rotated to a lower speed position, a lower speed will cause the warning signal to sound and an automatic application of the brakes to take place. When the plunger 37 and the cam 104 reach their minimum positions, that is, with the arm 38 resting against the stop 33, a very slight movement of the vehicle will cause the warning signal to sound, and the brakes to be applied.

In Fig. 2, I have shown a trackway with devices for automatically producing a varying zone of influence behind a moving train so that a second train equipped with the devices shown in Fig. 1, will be forced to gradually reduce its speed as it approaches nearer and nearer to the first mentioned train. 116, 117 are the rails of the trackway, the rail 116 being divided by suitable insulating joints into blocks, A, B, C, D, E, F, G, H, I and J. Adjacent to the trackway is a series of batteries 110, 111, 112, 113, 114 and 115. Running along adjacent to the trackway is a series of line wires 130, 131, 132, 133, 134 and 135. One terminal of the battery 110 is connected by a wire 118 to the track rail 117. The other terminal of the battery 110 is connected to the opposite terminal of the battery 111, and the connecting point of these two batteries is connected by wire 120 to the line wire 130. The other batteries are similarly connected, the connecting point of the batteries 111 and 112 being connected by the wire 121 to the line wire 131; the connecting point of the batteries 112 and 113 being connected by the wire 122 to the line wire 132; the connecting point of the batteries 113 and 114 being connected by the wire 123 to the line wire 133; the connecting point of the batteries 114 and 115 being connected by the wire 124 with the line wire 134 and the other terminal of the battery 115 being connected by the wire 125 with the line wire 135.

The result of these connections is as follows: The difference of potential between the track rail 117 and the line wire 130 is equal to the voltage of the battery 110. The difference of potential between the track rail 117 and the line wire 131 is equal to the combined voltage of the batteries 110 and 111. The difference of potential between the track rail 117 and the line wire 132 is equal to the combined voltage of the batteries 110, 111 and 112. The difference of potential between the track rail 117 and the line wire 133 is equal to the combined voltage of the batteries 110, 111, 112 and 113. The difference of potential between the track rail 117 and the line wire 134 is equal to the combined voltage of the batteries 110, 111, 112, 113 and 114. The difference of potential between the track rail 117 and the line wire 135 is equal to the combined voltage of the batteries 110, 111, 112, 113, 114 and 115.

As the different blocks are identical, I will merely describe the devices related to the block H. At one end of the block a track battery is connected across the track rails. At the other end of the block a track relay $119^h$ is connected across the track rails. The track relay $119^h$ has five neutral armatures $136^h$, $137^h$, $138^h$, $139^h$ and $140^h$. Each of these armatures has a front contact, which is adapted to be touched by said armature when relay $119^h$ is energized, and a back contact which is adapted to be touched by the said armature when the relay $119^h$ is deënergized. The front contact of the armature $136^h$ is connected by a wire $127^h$ with the armature $137^i$. The back contact of the armature $136^h$ is connected by a wire $128^h$ with the line wire 130. The front contact of the armature $137^h$ is connected by a wire $129^h$ with the armature $138^i$. The back contact of the armature $137^h$ is connected by a wire $141^h$ with the line wire 131. The front contact of the armature $138^h$ is connected by a wire $142^h$ with the armature $139^i$. The back contact of the armature $138^h$ is connected by a wire $143^h$ with the line wire 132. The front contact of the armature $139^h$ is connected by a wire $144^h$ with the armature $140^i$. The back contact of the armature $139^h$ is connected by a wire $145^h$ with the line wire 133. The front contact of the armature $140^h$ is connected by a wire $146^h$ with the line wire 135. The back contact of the armature $140^h$ is connected by a wire $147^h$ with the line wire 134. A signal rail $67^h$ is located near the entrance to the block H and is connected by a wire $126^h$ with the armature $136^h$.

Assuming that a train is occupying the block I, the track batteries for that block will be short circuited, thus deënergizing the track relay $119^i$, and causing all of the armatures associated with this relay to contact with their back contacts. This results in the following conditions in the signal rails in the rear of the train. The signal rail $67^i$ will be connected to the line wire 130 through the following circuit: from the signal rail $67^i$ to the line wire $126^i$, armature $136^i$, back contact, wire $128^i$ to the line wire 130. Signal rail $67^h$ will be connected to the line wire 131 through the following circuit: from the signal rail $67^h$ to the wire $126^h$, armature $136^h$, front contact, wire $127^h$, armature $137^i$, back contact, wire $141^i$ to the line wire 131. The signal rail $67^g$ will be connected to the line wire 132 through the following circuit: from the signal rail $67^g$ to the wire $126^g$, armature $136^g$, front contact, wire $127^g$, armature $137^h$, wire $129^h$, armature $138^i$, back contact wire $143^i$ to the line wire 132. The signal rail $67^f$ will be connected to the line wire 133 through the following circuit: from the signal rail $67^f$ to the wire $126^f$, armature $136^f$, front contact wire $127^f$, armature $137^g$, front contact wire $129^g$, armature $138^h$, front contact wire $142^h$, armature $139^i$ back contact, wire $145^i$ to the line wire 133. The signal rail $67^e$ will be connected to the line wire 134 through the following circuit: from the signal rail $67^e$, to the wire $126^e$, armature $136^e$, front contact, wire $127^e$ armature $137^f$, front contact, wire $129^f$, armature $138^g$, front contact, wire $144^h$, $142^g$, armature $139^h$, front contact, wire $140^i$, back contact, wire $147^i$ to the line wire 134. The signal rail $67^d$ will be connected to the line wire 135 through the following circuit: from the signal rail $67^d$ to the wire $126^d$, armature $136^d$, front contact, wire $127^d$, armature $137^e$, front contact, wire $129^e$, armature $138^f$, front contact, wire $142^f$, armature $139^g$, front contact, wire $144^g$, armature $140^h$, front contact, wire $146^h$ to the line wire 135. Similarly the signal rails $67^b$ and $67^c$ will be connected to the line wire 135.

Assuming now that the train remains in the block I and that another vehicle is approaching the train in the block I, it will be observed that as the second mentioned train passes over the signal rails $67^b$, $67^c$, and $67^d$, maximum voltage will be applied to the solenoid 46 and the cam 104 on the second train will be held in its maximum position, while the train is passing through the blocks B, C and D. Upon passing over the signal rail $67^e$, however, a lower voltage will be applied to the solenoid 46, and the result will be that the cam 104 will be subsequently moved in accordance with the movement of the vehicle to a lower permissible speed position. If the engineer does not reduce his speed to this lower permissible speed, the device on the vehicle will automatically reduce it. Upon passing over the signal rail $67^f$ a still lower voltage will be applied to the solenoid 46 and a still lower permissible speed position of the cam 104 will result. Similar reductions in the voltage and the consequent reductions in the permissible speed will result as the vehicle carried shoe passes over the signal rails $67^g$, $67^h$ and $67^i$, the permissible speed corresponding to the low voltage applied to the signal rail $67^i$, being a predetermined minimum speed of, for instance, five miles an hour, at which the train is allowed to proceed in an occupied block. It should be noted, that it will be necessary for the vehicle, as long as it is in the occupied block, to limit its speed to this minimum speed. If the engineer does not do this, an automatic application of the brakes will take place.

Assuming that the second train remained in the block I until the first train moved a sufficient distance ahead so that the signal rail 67ʲ would be connected with the line wire 135, in other words, with the maximum voltage, when the second train then moved so that its contact shoe would contact with the signal rail 67ʲ, the solenoid 46 would be energized with the maximum voltage, the plunger 37 would be moved to its maximum position and the cam 104 would accordingly be moved to its maximum speed position. The train would then be permitted to proceed through the block at any speed below the predetermined maximum speed without receiving an automatic application of the brakes. This predetermined maximum speed would be permitted until the second train again approached closer to the first train, or in other words, until the second train again encountered a signal rail to which was applied lower voltage than the maximum voltage.

Although I have particularly described the construction of one physical embodiment of my invention, nevertheless, I desire to have it understood that the form selected is merely illustrative, but does not exhaust the possible physical embodiments of the idea of means underlying my invention.

What I claim as new and desire to secure by Letters Patent of the United States, is:

1. In a speed control system for railway vehicles, a track, a vehicle thereon, a permissible speed device on the vehicle adapted to be set in a maximum speed position, a minimum speed position and a plurality of sub-maximum speed positions, a single contact shoe carried by the vehicle, intermittent means along the trackway adapted to coöperate with said contact shoe to actuate the permissible speed device to move it to various positions, and means for moving said permissible speed device in accordance with the distance traveled by the vehicle, when said device has been actuated by the means along the trackway to move from a given permissible speed position to a lower permissible speed position.

2. In a speed control system for railway vehicles, a track, a vehicle thereon, a permissible speed device on the vehicle, adapted to be set in a maximum speed position, a minimum speed position, and a plurality of submaximum speed positions, an actual speed device on the vehicle, a single contact shoe carried by the vehicle, intermittent means along the trackway adapted to coöperate with said contact shoe to actuate the permissible speed device to move it to various positions, means for moving said permissible speed device in accordance with the distance traveled by the vehicle, when said device has been actuated by the means along the trackway to move from a given permissible speed position to a lower permissible speed position, means for retarding the vehicle, and means for actuating the retarding means when the actual speed of the vehicle exceeds the permissible speed corresponding to the position of the permissible speed device.

3. In a speed control system for railway vehicles, a track, a vehicle thereon, a permissible speed device on the vehicle adapted to be set in a maximum speed position, a minimum speed position, and a plurality of submaximum speed positions, a single contact shoe carried by the vehicle, intermittent means along the trackway adapted to coöperate with said contact shoe to actuate the permissible speed device to move it to various positions, and means on the vehicle for driving said permissible speed device from the wheels of the vehicle, when said device has been actuated by the means along the trackway to move from a given permissible speed position to a lower permissible speed position.

4. In a speed control system for railway vehicles, a track, a vehicle thereon, a permissible speed device on the vehicle, adapted to be set in a maximum speed position, a minimum speed position and a plurality of submaximum speed positions, an actual speed device on the vehicle, a single contact shoe carried by the vehicle, intermittent means along the trackway adapted to coöperate with said contact shoe to actuate the permissible speed device to move it to various positions, means on the vehicle for driving said permissible speed device from the wheels of the vehicle, when said device has been actuated by the means along the trackway to move from a given permissible speed position to a lower permissible speed position, means for retarding the vehicle and means for actuating the retarding means when the actual speed of the vehicle exceeds the permissible speed corresponding to the position of the permissible speed device.

5. In a speed control system for railway vehicles, a track, a vehicle thereon, a permissible speed device on the vehicle, adapted to be set in a maximum speed position, a minimum speed position, and a plurality of submaximum speed positions, a single contact shoe carried by the vehicle, intermittent devices along the trackway adapted to coöperate with said contact shoe to actuate the permissible speed device to move it to various positions, means for moving said permissible speed device, when said device has been actuated by the devices along the trackway to move from a given permissible speed position to a higher permissible speed position, and further means for moving said permissible speed device, when said device has been actuated by the devices along the trackway to move from a given permissible speed position to a lower permissible speed position, said first mentioned means being adapted to move the permissible speed device at a higher rate of speed than said second mentioned means.

6. In a speed control system for railway vehicles, a track, a vehicle thereon, a permissible speed device on the vehicle adapted to be set in a maximum speed position, a minimum speed position, and a plurality of submaximum speed positions, an actual speed device on the vehicle, a single contact shoe carried by the vehicle, intermittent devices along the trackway adapted to coöperate with said contact shoe to actuate the permissible speed device to move it to various positions, means for moving said permissible speed device, when said device has been actuated by the devices along the trackway to move from a given permissible speed position to a higher permissible speed position, further means for moving said permissible speed device when said device has been actuated by the devices along the trackway to move from a given permissible speed position to a lower permissible speed position, said first mentioned means being adapted to move the permissible speed device at a higher rate of speed than said second mentioned means, means for retarding the vehicle, and means for actuating the retarding means when the actual speed of the vehicle exceeds the permissible speed corresponding to the position of the permissible speed device.

7. In a speed control system for railway vehicles, a track, a vehicle thereon, a permissible speed device on the vehicle, adapted to be set in a maximum speed position, a minimum speed position, and a plurality of submaximum speed positions, a single contact shoe carried by the vehicle, intermittent means along the trackway adapted to coöperate with said contact shoe to actuate the permissible speed device to move it to various positions, means including said means along the trackway for moving said permissible speed device, when said device has been actuated by the means along the trackway to move from a given permissible speed position to a higher permissible speed position, and means on the vehicle for moving said permissible speed device in accordance with the distance traveled by the vehicle, when said device has been actuated by the means along the trackway to move from a given permissible speed position to a lower permissible speed position.

8. In a speed control system for railway vehicles, a track, a vehicle thereon, a permissible speed device on the vehicle adapted to be set in a maximum speed position, a minimum speed position and a plurality of submaximum speed positions, an actual speed device on the vehicle, a single contact shoe carried by the vehicle, intermittent means along the trackway adapted to coöperate with said contact shoe to actuate the permissible speed device to move it to various positions, means including said means along the trackway for moving said permissible speed device, when said device has been actuated by the means along the trackway to move from a given permissible speed position to a higher permissible speed position, means on the vehicle for moving said permissible speed device in accordance with the distance traveled by the vehicle, when said device has been actuated by the means along the trackway to move from a given permissible speed position to a lower permissible speed position, means for retarding the vehicle, and means for actuating the retarding means when the actual speed of the vehicle exceeds the permissible speed corresponding to the position of the permissible speed device.

9. In a speed control system for railway vehicles, a track, a vehicle thereon, a permissible speed device on the vehicle adapted to be set in a maximum speed position, a minimum speed position, and a plurality of submaximum speed positions, a single contact shoe carried by the vehicle, intermittent means along the trackway adapted to coöperate with said contact shoe to actuate the permissible speed device to move it to various positions, means including said means along the trackway for moving said permissible speed device, when said device has been actuated by the means along the trackway to move from a given permissible speed position to a higher permissible speed position, means on the vehicle for moving said permissible speed device in accordance with the distance traveled by the vehicle, when said device has been actuated by the means along the trackway to move from a given permissible speed position to a lower permissible speed position and means on the vehicle for maintaining the permissible speed device in the position to which it has been moved.

10. In a speed control system for railway vehicles, a track, a vehicle thereon, a permissible speed device on the vehicle adapted to be set in a maximum speed position, a minimum speed position and a plurality of submaximum speed positions, an actual speed device on the vehicle, a single contact shoe carried by the vehicle, intermittent means along the trackway adapted to coöperate with said contact shoe to actuate the permissible speed device to move it to various positions, means including said means along the trackway for moving said permissible speed device when said device has been actuated by the means along the trackway to move from a given permissible speed position to a higher permissible speed position, means on the vehicle for moving the said permissible speed device in accordance with the distance traveled by the vehicle, when said device has been actuated by the means along the trackway to move from a given permissible speed position to a lower permissible speed position, means on the vehicle for maintaining the permissible speed device in the position to which it has been moved, means for retarding the vehicle, and means for actuating the retarding means when the actual speed of the vehicle exceeds the permissible speed corresponding to the position of the permissible speed device.

11. In a speed control system for railway vehicles, a track, a vehicle thereon, a movable member on the vehicle adapted to be set in a plurality of different positions, a permissible speed device on the vehicle adapted to be set in a plurality of permissible speed positions, each of said positions corresponding to a given position of the movable member, intermittent means along the trackway for moving the movable member to various positions, means for simultaneously moving the permissible speed device and the movable member, when the movable member is moved in one direction, and means for moving the permissible speed device from one position to another in accordance with the distance traveled by the train, when the movable member is moved in the opposite direction.

12. In a speed control system for railway vehicles, a trackway divided into blocks, a signal rail at the entrance to each block, means responsive to the presence of a vehicle in any block for producing different electrical conditions in the signal rails in the rear thereof, a permissible speed device on a following vehicle adapted to be set in a maximum speed position, a minimum speed position, and a plurality of submaximum speed positions, a single contact shoe carried by the said vehicle, means including the said contact shoe and the said signal rails to actuate the permissible speed device to move to a lower permissible speed position as the said vehicle approaches close to the first vehicle, and means for moving the said permissible speed device in accordance with distance traveled by the said vehicle.

PAUL J. SIMMEN.